No. 885,077. PATENTED APR. 21, 1908.
W. L. PAUL.
PIVOTED AXLE CULTIVATOR.
APPLICATION FILED MAY 10, 1906.
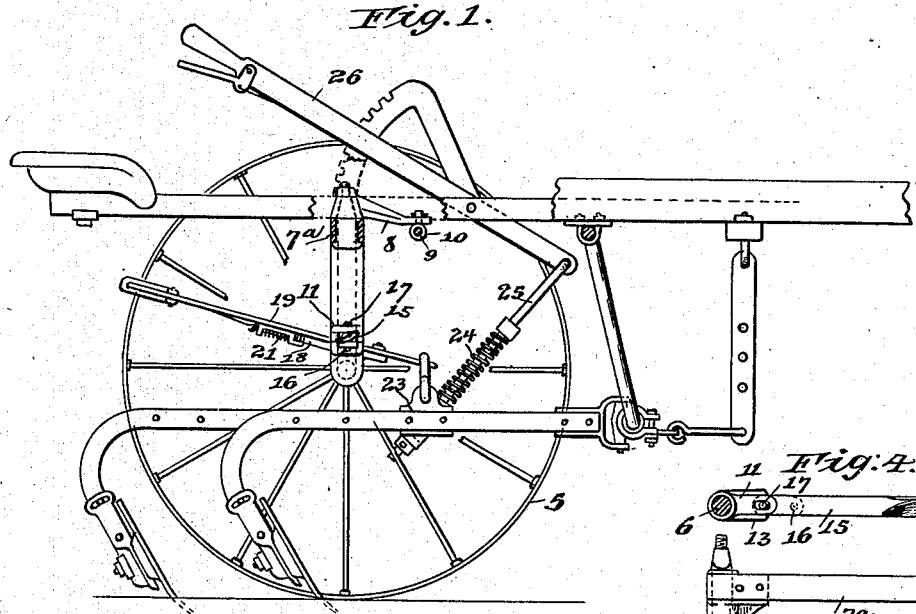
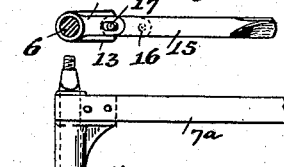
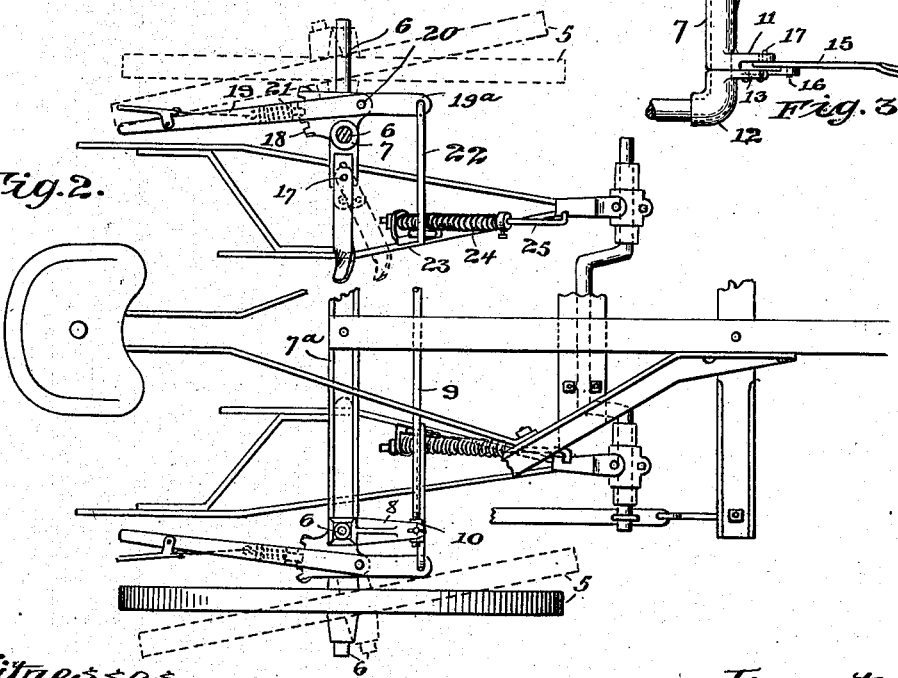
Witnesses,
Inventor,
William L. Paul
By Offield, Towle & Linthicum
Attys.

UNITED STATES PATENT OFFICE.

WILLIAM L. PAUL, OF PERU, ILLINOIS, ASSIGNOR TO PERU PLOW & WHEEL COMPANY, OF PERU, ILLINOIS, A CORPORATION OF ILLINOIS.

PIVOTED-AXLE CULTIVATOR.

No. 885,077.　　　　Specification of Letters Patent.　　　Patented April 21, 1908.

Application filed May 10, 1906. Serial No. 316,169.

*To all whom it may concern:*

Be it known that I, WILLIAM L. PAUL, a citizen of the United States, residing at Peru, Lasalle county, Illinois, have invented certain new and useful Improvements in Pivoted-Axle Cultivators, of which the following is a specification.

This invention relates to certain improvements in straddle-row, wheel cultivators, and more particularly to that class of cultivators in which the carrying wheels are mounted on axles turning on a vertical pivot. In this class of devices the vertically disposed portions of the axle are ordinarily connected with shifting levers so that they may be turned in their bearings to change the angular position of the wheels; and for the purpose of placing the pivoted axles under the control of the driver they have usually been provided with a foot lever turning therewith, this foot lever being a simple lever and directly attached so that a comparatively short swing of this lever would effect a considerable variation in the position of the wheels, and consequently there is a liability of cutting the wheels too much, resulting in the contact of the shovels with the growing plants. To overcome this difficulty and provide a form of lever whereby a long swing may be permitted without too great change in the angular position of the wheels, and also to afford a greater leverage and consequently greater ease of operation, I have compounded this foot-controlled lever and have connected it indirectly to the pivoted axle. I also connect to the pivoted axle forwardly extended arms which are connected by pivoted links to the cultivator beams behind the pivotal connection of the latter to the frame so that the shovel beams or gangs move in unison with the turning movement of the pivoted axle. These forwardly extended arms may be pivoted to the axle or member turning therewith and are preferably provided with rearwardly extended members constituting the hand-controlled adjusting levers, the latter having a locking mechanism so that the setting of the gangs may be conveniently effected.

In the accompanying drawings, Figure 1 is an elevation, partly in longitudinal section; Fig. 2 is a plan view, with parts broken away and others omitted; and Figs. 3 and 4 are detail views of the wheel control lever.

In the drawings, 5 represents the ground wheels which are mounted on axles, 6, the inner ends of the latter being upturned and extending into socketed brackets, 7, in which they turn. At their upper ends these axle members are provided with arms, 8, secured rigidly thereto, and the arms on opposite sides of the cultivator are connected by a rod, 9, so that the axles and the wheels mounted on them are caused to turn in unison. The connecting rod, 9, is provided at each end with a pivoted knuckle in the form of a threaded block, 10, the ends of the rod being threaded into these blocks, so as to permit of the adjustment of the set of the wheels. At the lower ends of the socketed brackets are provided rigid arms, 11, and beneath these brackets on the bent portion of the axle is an elbow casting, 12, provided with an outstanding arm, 13. The foot controlled lever, 15, has a pivot pin, 16, entering a socket in the terminal portion of the arm, 13, and a pivot pin, 17, entering a socket in the terminal portion of the arm, 11. The foot lever is therefore made to swing around the pin, 16, as a center and by virtue of its pivotal connection with the arm, 11, on bracket, 7, which is rigid with the frame member, 7ª, and by reason of its pivotal connection at 16 with arm 13 the upright portion of the axle is turned in the socketed bracket as the lever, 15, is vibrated. The bracket casting, 12, is also provided with a rack member, 18, and a hand lever, 19, is pivoted to said casting at 20, and is provided with a locking detent, 21, to engage the teeth of the rack. The lever, 19, is extended beyond its pivot and to the extension, 19ª is pivoted a link, 22, connected by an eye with the cultivator beam, 23, one of these links being provided at each side of the machine, and connected to the beam on that side as shown, or each of said links may extend and be connected to the beam on the opposite side.

24 are cushion springs, carried by the rod, 25, pivoted to the hand levers 26, and serving by the extension of the coils of the springs to hold the plows in the ground. The other parts of the cultivator are of usual construction and need no particular mention.

By means of the foot levers the wheels may be adjusted to various angular positions so as to afford the necessary range of movement to permit plowing crooked rows and since the axles of the two ground wheels are connected transversely of the machine, the movement of one of these levers by a forward thrust will turn the wheels in one direction and the forward movement of the lever on the opposite side will turn the wheels in the opposite direction. It will be observed that by compounding the lever the movement of the wheels can be effected with greater ease although the distance which the outer end of the lever swings is greater for a given movement of the wheel than if a simple lever were employed. By means of the described connections between the axles and gangs the latter are made to move in unison with the axles and by means of the hand levers the gangs may be set at different distances apart so as to hold the shovels in the desired position relative to the growing plants, and this is particularly useful in cultivating corn in different stages of growth. It will also be seen that the cultivator may be used as a walking cultivator by applying handles to the gangs or cultivator beams. In this case the handles and gangs serve as guiding members and act upon the wheels whereas in the first described arrangement the guiding is transmitted through the wheel axles to the gangs.

I claim:

1. In a pivoted axle cultivator, the combination with axles having journaled portions, of an operating lever having a fixed pivot and also a direct pivotal connection with a part turning with the journaled portion of the axle, the pivots being so arranged that the turning movement of the axle is less than the swinging movement of its controlling lever, substantially as described.

2. In a pivoted axle cultivator, the combination with axles having journaled portions and socket bearings in which said journaled portions turn, a bracket member turning with the axle, and an actuating lever pivoted between its ends to the said bracket member and having also a pivotal connection with the stationary member or socket bearing between the journal axis and the pivot of the actuating lever, substantially as described.

3. In a pivoted axle cultivator, the combination with an axle having an upright journaled portion, a socketed bearing in which said portion turns, said socketed bearing having a bracket member rigid therewith, a bracket member turning with the axle and having an arm rigid therewith and an operating lever pivoted between its ends to the axle bracket, and at its extremity to the bracket arm of the bearing member, substantially as described.

4. In a cultivator of the class described, the combination with wheel axles having journaled portions, compound levers for controlling said journals, and connections between said journaled portions whereby the wheels may be turned in unison, substantially as described.

5. In a cultivator of the class described, the combination with pivoted axles of a foot controlled lever for turning said axles and a hand-operated lever adjustably connected with the axle and turning therewith, the hand-operated levers being also connected with the shovel beams, substantially as described.

6. In a cultivator of the class described, the combination of axles having journaled portions, foot controlled levers for turning said axles on their journals, and hand-controlled levers adjustably connected with the axles and pivotally connected with the shovel beams, substantially as described.

7. In a cultivator of the class described, the combination with pivoted axles having bracket members turning therewith, levers pivoted on said bracket members and extended forwardly of their pivots and shovel beams or gangs pivotally connected to the forward extensions of said arms, substantially as described.

8. In a cultivator, the combination with pivoted axles, compound foot levers for controlling said axles, hand-controlled levers adjustably connected with the pivoted axles and extended forwardly of said pivots, pivoted gangs or shovel beams and connections between the extended ends of the levers and the beams in the rear of their pivotal connection with the frame, substantially as described.

9. In a cultivator, the combination with pivoted axles, compound foot levers for controlling said axles, forwardly extending arms on said axles, said arms being pivotally connected to the cultivator gangs at a point rearwardly of the pivoted connection of the gangs to the frame, substantially as described.

10. In a cultivator, the combination with pivoted axles, foot levers for controlling said axles, forwardly extending arms on said axles, said arms being pivotally connected to the cultivator gangs at a point rearwardly of the pivoted connection of the gangs to the frame, substantially as described.

In testimony whereof, I have hereunto set my hand this 5 day of May, 1906, in the presence of two subscribing witnesses.

WILLIAM L. PAUL.

Witnesses:
C. C. LINTHICUM,
CHAS. F. MURRAY.